US012763673B2

(12) United States Patent
Messina et al.

(10) Patent No.: US 12,763,673 B2
(45) Date of Patent: Oct. 13, 2026

(54) TOTEM POLE POWER FACTOR CORRECTION DEVICE AND CURRENT SPIKE REDUCTION METHOD

(71) Applicant: STMicroelectronics International N.V., Geneva (CH)

(72) Inventors: Sebastiano Messina, Mascalucia (IT); Marco Torrisi, Gravina di Catania (IT)

(73) Assignee: STMicroelectronics International N.V., Geneva (CH)

( * ) Notice: Subject to any disclaimer, the term of this patent is extended or adjusted under 35 U.S.C. 154(b) by 165 days.

(21) Appl. No.: 18/739,793

(22) Filed: Jun. 11, 2024

(65) Prior Publication Data

US 2025/0379514 A1 Dec. 11, 2025

(51) Int. Cl.
*H02M 1/42* (2007.01)

(52) U.S. Cl.
CPC ................................ *H02M 1/4233* (2013.01)

(58) Field of Classification Search
CPC ................................................. H02M 1/4233
See application file for complete search history.

(56) References Cited

U.S. PATENT DOCUMENTS 9,252,654 B1 * 2/2016 Tomioka ............. H02M 1/4225
11,575,315 B2 2/2023 Fu et al.
11,742,768 B2 8/2023 Jitaru
11,811,307 B2 11/2023 Cohen
2021/0211041 A1 * 7/2021 Yamane ................ H02M 7/219
2022/0271651 A1 8/2022 Ye et al.
2022/0345033 A1 10/2022 Mesa et al.
2026/0058546 A1 * 2/2026 Werner ............... H02M 1/4208

FOREIGN PATENT DOCUMENTS

CN 109617387 A * 4/2019 ............. H02M 1/44
CN 117639533 A 3/2024

OTHER PUBLICATIONS

Sun, B. "How to reduce current spikes at AC zero-crossing for totem-pole PFC". Analog Applications Journal. pp. 23-26 (Year: 2015).*
Machine translation of CN 109617387. (Year: 2019).*
(Continued)

*Primary Examiner* — Peter M Novak
(74) *Attorney, Agent, or Firm* — Alston & Bird LLP

(57) ABSTRACT

In accordance with various embodiments of the present disclosure, a totem pole power factor correction (PFC) device is provided. In some embodiments, the totem pole PFC device comprises a low frequency leg comprising first and second low frequency switches, a high frequency leg comprising first and second high frequency switches, and a controller configured to control the low and high frequency switches. During each of a plurality of transition zones zone starting before and ending after a respective zero crossing of an AC input voltage, the controller holds open the low frequency switches and one of the high frequency switches and closes and opens a different one of the high frequency switches according to a predetermined transition duty cycle to provide a gradual transition of a midpoint voltage of the low frequency leg from its maximum value to zero volts or from zero volts to its maximum value.

20 Claims, 3 Drawing Sheets

(56) References Cited

OTHER PUBLICATIONS

Mandal et al., "A unified control strategy for improved performance of Totem-Pole Power Factor Correction Boost Converter," IEEE Global Conference on Computing, Power and Communication Technologies (GlobConPT), New Delhi, India, pp. 1-6, doi: 10.1109/GlobConPT57482.2022.9938351 (Sep. 2022).

Sun, "How to reduce current spikes at AC zero-crossing for totem pole PFC," Texas Instrum. Analog Appl. J., vol. 4, p. 1 32, 4th Quart., (2015).

Ye et al. "Totem-Pole PFC Reliability and Performance Improvement With Advanced Controls," in IEEE Power Electronics Magazine, vol. 9, No. 3, pp. 37-44, doi: 10.1109/MPEL.2022.3194285, (Sep. 2022).

* cited by examiner

TOTEM POLE POWER FACTOR CORRECTION DEVICE AND CURRENT SPIKE REDUCTION METHOD

FIELD OF THE INVENTION

Example embodiments of the present disclosure relate generally to power factor correction devices and, more particularly, to totem pole bridgeless power factor correction devices.

BACKGROUND

To meet typical power quality standards, most power electronic equipment needs power factor correction (PFC) at a front-end stage. Moreover, most applications require such PFC devices to have high efficiency.

To meet these requirements, bridgeless topologies, like totem pole PFC devices, are becoming one the preferred solutions to eliminate the large bridge losses of traditional bridged PFC devices. Totem pole PFC topology is very efficient but presents a critical point during each zero crossing of the AC input voltage in which a current spike happens. If not controlled, such current spikes may cause problems with the switches, electromagnetic interference (EMI) causing malfunctioning of appliances, and worsening of the input current total harmonic distortion (THD) and power factor.

Applicant has identified many technical challenges and difficulties associated with such PFC devices. Through applied effort, ingenuity, and innovation, Applicant has solved problems related to such PFC devices by developing solutions embodied in the present disclosure, which are described in detail below.

BRIEF SUMMARY

Various embodiments described herein related to totem pole power factor correction devices and associated methods of providing power factor correction.

In accordance with various embodiments of the present disclosure, a totem pole power factor correction device is provided. In some embodiments, the totem pole power factor correction device comprises a low frequency leg comprising first and second low frequency switches, a high frequency leg comprising first and second high frequency switches, an alternating current (AC) voltage input comprising a first leg electrically connected between the first and second low frequency switches and a second leg electrically connected between the first and second high frequency switches, and a controller connected to and configured to control the first and second low frequency switches and the first and second high frequency switches. The AC voltage input is adapted to receive an AC input voltage to be converted to a direct current (DC) output voltage. During each of a plurality of transition zones, each transition zone starting before and ending after a respective zero crossing of the AC input voltage, the controller is configured to (i) hold open the first and second low frequency switches and one of the first and second high frequency switches and (ii) close and open a different one of the first and second high frequency switches according to a predetermined transition duty cycle to provide a gradual transition of a midpoint voltage of the low frequency leg from its maximum value to zero volts or from zero volts to its maximum value. Between transition zones, the controller is configured to control the closing and opening of the first and second low frequency switches and the first and second high frequency switches according to a predetermined operating duty cycle for each of the first and second low frequency switches and the first and second high frequency switches to provide power factor correction.

In some embodiments, during each transition zone when the AC input voltage is transitioning from a negative voltage to a positive voltage, the controller is configured to hold open the first high frequency switch and to close and open the second high frequency switch according to the predetermined transition duty cycle. During each transition zone when the AC input voltage is transitioning from a positive voltage to a negative voltage, the controller is configured to hold open the second high frequency switch and to close and open the first high frequency switch according to the predetermined transition duty cycle.

In some embodiments, during each transition zone when the AC input voltage is transitioning from a negative voltage to a positive voltage, the midpoint voltage of the low frequency leg gradually transitions from its maximum value to zero. During each transition zone when the AC input voltage is transitioning from a positive voltage to a negative voltage, the midpoint voltage of the low frequency leg gradually transitions from zero to its maximum value.

In some embodiments, the predetermined transition duty cycle is less than ten percent.

In some embodiments, the predetermined transition duty cycle is fixed.

In some embodiments, the predetermined transition duty cycle is variable.

In some embodiments, the predetermined transition duty cycle increases over each respective transition zone.

In some embodiments, each of the first and second low frequency switches and the first and second high frequency switches comprise one or more switching transistors.

In some embodiments, each of the first and second low frequency switches comprise one or more thyristors.

In some embodiments, each of the first and second low frequency switches comprise one or more diodes.

In accordance with various embodiments of the present disclosure, a method of providing power factor correction is provided. In some embodiments, the method comprises providing a totem pole power factor correction device as described above; supplying, to the AC voltage input of the totem pole power factor correction device, an AC input voltage to be converted to a direct current (DC) output voltage; during each of a plurality of transition zones, each transition zone starting before and ending after a respective zero crossing of the AC input voltage, (i) holding open, by the controller, the first and second low frequency switches and one of the first and second high frequency switches and (ii) closing and opening, by the controller, a different one of the first and second high frequency switches according to a predetermined transition duty cycle to provide a gradual transition of a midpoint voltage of the low frequency leg from its maximum value to zero volts or from zero volts to its maximum value; and between transition zones, closing and opening, by the controller, the first and second low frequency switches and the first and second high frequency switches according to a predetermined operating duty cycle for each of the first and second low frequency switches and the first and second high frequency switches to provide power factor correction.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will also be appreciated that the scope of the disclosure encompasses many potential embodiments in addition to those here summarized, some of which will be further described below.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1:
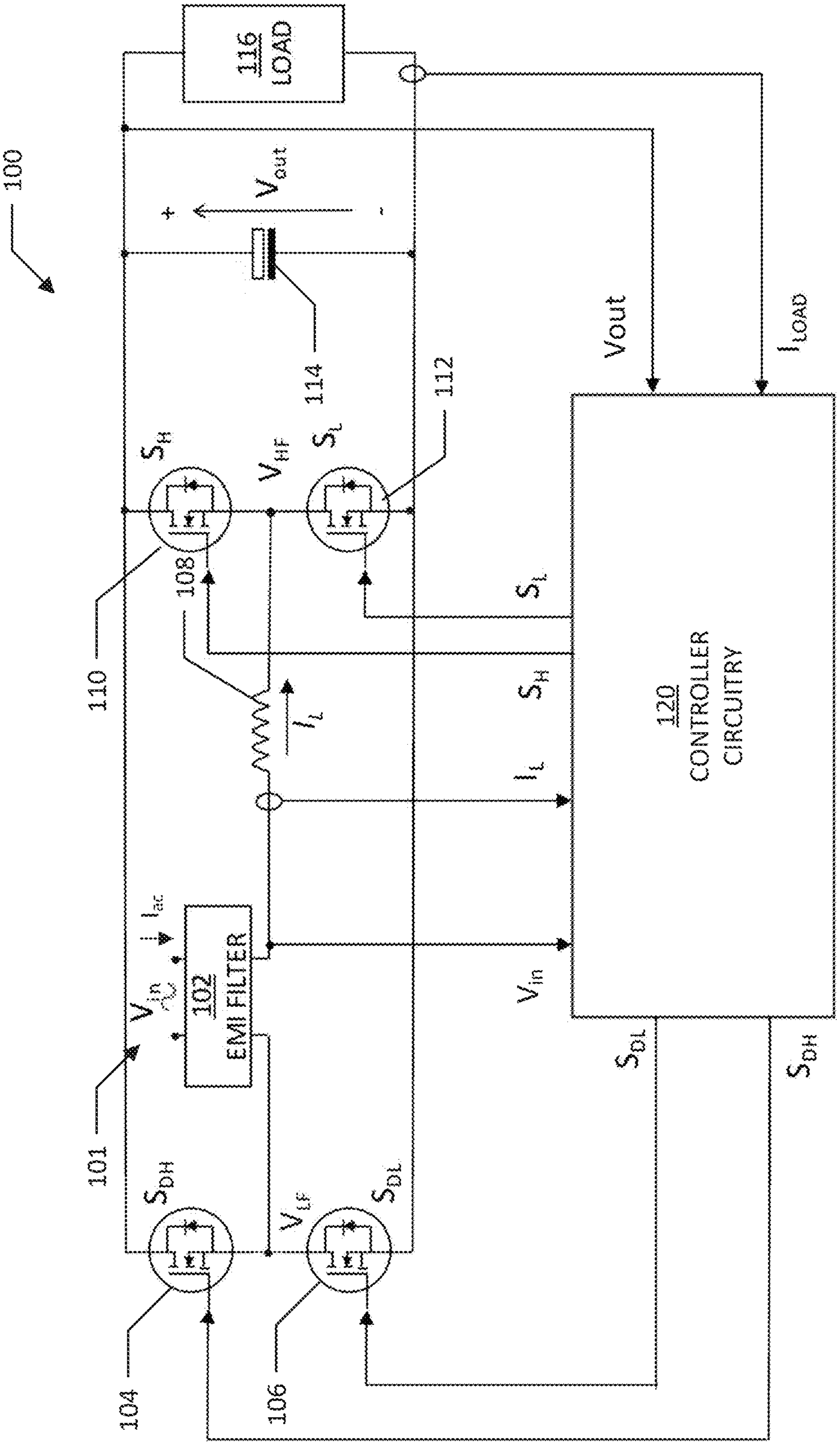
FIG. 1 is a simplified circuit diagram of an example totem pole power factor correction device, in accordance with some embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

Various embodiments of the present disclosure overcome the above technical challenges and difficulties and provide various technical improvements and advantages based on, for example, but not limited to, providing example totem pole PFC devices and methods in which there is a transition zone around each zero crossing of the AC input voltage in which one of the high frequency switches is driven with a reduced duty cycle and all other switches are off. In this regard, there is a gradual transition of the midpoint voltage of the low frequency leg of the PFC device from its maximum value to zero volts (V) or from zero volts to its maximum value, thereby preventing a current spike.

Referring now to the figures, FIG. 1 is a simplified circuit diagram of an example totem pole power factor correction device in accordance with some embodiments of the present disclosure. As seen in FIG. 1, an example totem pole PFC device 100 comprises a low frequency leg comprising a first low frequency switch 104 (also labeled $S_{DH}$) and a second low frequency switch 106 (also labeled $S_{DL}$) in a half-bridge configuration, a high frequency leg comprising a first high frequency switch 110 (also labeled $S_H$) and a second high frequency switch 112 (also labeled $S_L$) in a half-bridge configuration, an alternating current (AC) voltage input 101 in which an AC input voltage $V_{in}$ is input through an EMI filter 102, an output capacitor 114, a load 116, and controller circuitry 120. In the illustrated embodiment, the AC voltage input 101 has a first leg electrically connected to a midpoint between the first and second low frequency switches 104, 106 (with a voltage $V_{LF}$ at that midpoint) and a second leg electrically connected (through an inductor 108) to a midpoint between the first and second high frequency switches 110, 112 (with a voltage VHF at that midpoint. In various embodiments, the AC input voltage is converted to a direct current (DC) output voltage $V_{out}$ which is provided to a load 116. Some examples, not exhaustive, of power electronic switches in various embodiments of the present disclosure include diodes, thyristors (e.g., diode for alternating current (DIAC), triode for alternating current (TRIAC), silicon controlled rectifier (SCR), gate turn-off thyristor (GTO), MOS-controlled thyristor (MCT), static induction thyristor (SITH), etc.) or transistors (e.g., bipolar junction transistor (BJT), field-effect transistor (FET), metal oxide semiconductor field-effect transistor (MOSFET), insulated-gate bipolar transistor (IGBT), static induction transistor (SIT), etc.). In general, the technology of the above mentioned switches can comprise, but is not limited to, silicon (Si), silicon carbide (SiC) or gallium nitride (GaN). In various embodiments, the first low frequency switch 104, the second low frequency switch 106, the first high frequency switch 110, and the second high frequency switch 112 each comprise a switching transistor. In some embodiments, the first and second low frequency switches comprise first and second diodes or first and second silicon controlled rectifiers (SCRs) or other types of thyristor. In various embodiments, the first and the second low frequency switches and/or the first and the second high frequency switches each comprise one or more switches connected in different configurations (e.g., series, parallel, cascode, etc.). In various embodiments, the first and the second low frequency switches and/or the first and the second high frequency switches each comprise a combination of more different types of switches and/or different technologies (e.g., Si-IGBT and SiC-MOSFET in parallel configurations, GaN-FET and Si-MOSFET in cascode configurations, Si-BJT and Si-MOSFET in cascode configurations, etc.), which could be known as "hybrid" configurations.

In various embodiments, the controller circuitry 120 receives as inputs the AC input voltage $V_{in}$, the current $I_L$ through the inductor 108, the output voltage $V_{out}$, and the current $I_{LOAD}$ through the load 116. In various embodiments, the controller circuitry 120 provides outputs to each of the first and second low frequency switches 104, 106 and the first and second high frequency switches 110, 112 to control the closing and opening of the switches as described herein. In various embodiments, the controller circuitry 120 is configured to control the first and second low frequency switches 104, 106 and the first and second high frequency switches 110, 112 according to a predetermined operating duty cycle to provide power factor correction. In various embodiments, this predetermined operating duty cycle, which is further detailed in FIG. 2, is performed between the transition zones around each zero crossing of the AC input voltage (described below).

Figure 2:
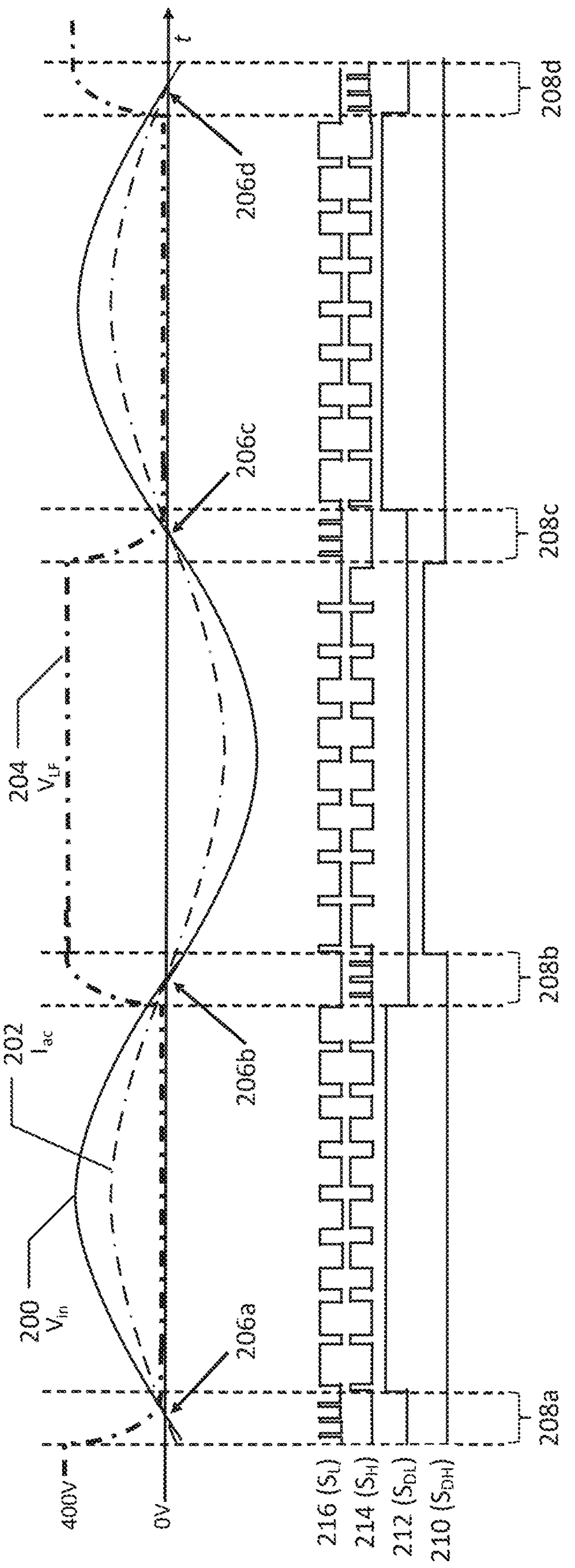
FIG. 2 illustrates example waveforms associated with the example totem pole power factor correction device of FIG. 1.

Referring now to FIG. 2, example waveforms associated with an example totem pole power factor correction device of embodiments of the present disclosure are illustrated. In FIG. 2, one and a half cycles of the AC input voltage 200 ($V_{in}$) are shown, with four zero crossing points 206*a-d*, and inducing an AC current 202 ($I_{ac}$). In the illustrated embodiment, there are four transition zones 208*a-d* shown, each corresponding to a respective one of the zero crossing points 206*a-d*. As illustrated, each of the transition zones 208*a-d* starts before and ends after its respective zero crossing point 206*a-d*. In various embodiments, each of the transition zones 208*a-d* is symmetric about its respective zero crossing point 206*a-d*. In various embodiments, each of the transition zones 208*a-d* may be any suitable length, depending on how long it takes for the midpoint voltage to decay, which may be determined experimentally based on the specific design of the PFC device. In one specific example, each of the transition zones 208*a-d* is about 200 microseconds (μsec) in length.

In various embodiments, any suitable method may be used to determine when each transition zone begins and ends. For example, in various embodiments the start of each transition zone is determined based on an elapsed time from the immediately preceding zero crossing of the AC input voltage. The elapsed time from the immediately preceding zero crossing of the AC input voltage is calculated as (time of ½ cycle of the AC input voltage−time of ½ of the specified length of the transition zone). For example, in a 50 Hertz (Hz) system, each cycle of the AC input voltage is 20 milliseconds (msec), and each half cycle is 10 msec. If the desired length of the transition zones has been determined to be 200 μsec (half of which is 100 μsec), each transition zone starts 9.9 msec (i.e., 10 msec minus 100 usec) after the immediately preceding zero crossing of the AC input voltage. In other example embodiments, the start of each transition zone may be determined based on the phase angle (e.g., 355 degrees and 175 degrees) or the voltage level of the AC input voltage (e.g., +50V and −50V).

In various embodiments, the voltage 204 ($V_{LF}$) at the midpoint between the first and second low frequency switches 104, 106 alternates between zero volts during the positive half cycle of the AC input voltage and its maximum voltage (e.g., 400 volts, but could be, in general, variable in the range 200V-800V) during the negative half cycle of the AC input voltage. If the midpoint voltage $V_{LF}$ abruptly transitions from its maximum value to zero volts or from zero volts to its maximum value, a current spike can occur.

FIG. 2 illustrates the control signal 210 for the first low frequency switch 104, the control signal 212 for the second low frequency switch 106, the control signal 214 for the first high frequency switch 110, and the control signal 216 for the second high frequency switch 112. In the illustrated embodiment, a high control signal indicates a closed switch and a low control signal indicates an open switch.

In various embodiments, in the periods between the transition zones, the closing and opening of the switches 104, 106, 110, 112 controlled by these control signals (respectively) 210, 212, 214, 216 according to the operating duty cycle shapes the current $I_{ac}$ to provide the desired power factor correction. In this regard, the opening and closing of the switches during the operating duty cycle is often termed "current control." As seen in FIG. 2, when $V_{in}$ is positive and close to the transition zones, the duty cycle of the second high frequency switch 112 is high (typically as high as 99%) and the duty cycle of the first high frequency switch 110 is low (typically as low as 1%). Conversely, when $V_{in}$ is negative and close to the transition zones, the duty cycle of the first high frequency switch 110 is high (typically as high as 99%) and the duty cycle of the second high frequency switch 112 is low (typically as low as 1%). At the peak of $V_{in}$, the duty cycle is at its minimum value. In general, the operating duty cycle is variable and its instantaneous value depends on the instantaneous ratio between $V_{out}$ and $V_{in}$. The duty cycles of the low frequency switches 104, 106 follow the frequency of $V_{in}$ as illustrated in FIG. 2. As seen in FIG. 2, in the periods between the transition zones, when the first high frequency switch 110 is closed, the second high frequency switch 112 is open and vice versa. Similarly, in the periods between the transition zones, when the first low frequency switch 104 is closed, the second low frequency switch 106 is open and vice versa.

In various embodiments, in each transition zone, the current control signals and the low frequency switches are disabled (i.e., the control signals that are shown in FIG. 2 in the periods between the transition zones are deactivated), but the high frequency rectifier switch is driven at a low duty cycle. This low duty cycle of the high frequency rectifier switch may be termed a "transition duty cycle." In various embodiments, the high frequency rectifier switch is the second high frequency switch 112 in each transition zone in which $V_{in}$ is transitioning from a negative voltage to a positive voltage and the high frequency rectifier switch is the first high frequency switch 110 in each transition zone in which $V_{in}$ is transitioning from a positive voltage to a negative voltage. As seen in FIG. 2, in transition zones 208*a* and 208*c*, when $V_{in}$ is transitioning from a negative voltage to a positive voltage, the control signals 210, 212, 214 are low such that, respectively, the first low frequency switch 104, the second low frequency switch 106, and the first high frequency switch 110 are open, while the second high frequency switch 112 is closed and opened at a low duty cycle. Conversely, in transition zones 208*b* and 208*d*, when $V_{in}$ is transitioning from a positive voltage to a negative voltage, the control signals 210, 212, 216 are low such that, respectively, the first low frequency switch 104, the second low frequency switch 106, and the second high frequency switch 112 are open, while the first high frequency switch 110 is closed and opened at a low duty cycle.

In various embodiments, the transition duty cycle is selected to be sufficient to provide for a gradual transition of the midpoint voltage of the low frequency leg of the PFC device from its maximum value to zero volts or from zero volts to its maximum value, thereby preventing a current spike. In various embodiments, the transition duty cycle can be fixed or variable (e.g., increasing over the transition zone). In an example embodiment, the transition duty cycle is less than ten percent. In another example embodiment, the transition duty cycle is less than one percent. In another example embodiment, the transition duty cycle starts at about 1% and increases over the transition zone up to about 10%.

In FIG. 2, the alternating of the midpoint voltage 204 ($V_{LF}$) between zero volts during the positive half cycle of the AC input voltage and its maximum voltage (e.g., 400 volts) during the negative half cycle of the AC input voltage is illustrated. In various embodiments, as described above, disabling the current control signals and driving the high frequency rectifier switch at the transition duty cycle (such that the low frequency switches and the other high frequency switch are open) during each transition cycle ensures a gradual transition of the midpoint voltage 204 ($V_{LF}$) from its maximum voltage to 0V (as seen in FIG. 2 during transition zones 208*a*, 208*c*) or from 0V to its maximum voltage (as seen in FIG. 2 during transition zones 208*b*, 208*d*).

In various embodiments, as seen in FIG. 2, immediately after each transition zone, the opening and closing of the switches according to the operating duty cycle (i.e., current control) resumes to provide the desired power factor correction until the next transition zone. Embodiments of the present disclosure therefore eliminate current spikes without introducing a current control delay that can increase THD.

Controller circuitry 120 may be embodied in a number of different ways. In various embodiments, the use of the terms "controller," "controller circuitry," "processor," "processing circuitry," should be understood to include one or more "analog controllers" (also called an "Application Specific Integrated Circuit" (ASIC)) or a single core processor, a multi-core processor, multiple processors internal to the device 100, and/or one or more remote or "cloud" processor(s) external to the device 100. In some example embodiments, controller circuitry 120 may include one or more processing devices configured to perform independently. Alternatively, or additionally, controller circuitry 120 may include one or more processor(s) configured in tandem via a bus to enable independent execution of operations, instructions, pipelining, and/or multithreading.

In an example embodiment, the controller circuitry 120 may be configured to execute instructions stored in memory circuitry (not illustrated) or otherwise accessible to the processor. Alternatively, or additionally, the controller circuitry 120 may be configured to execute hard-coded functionality. As such, whether configured by hardware or software methods, or by a combination thereof, controller circuitry 120 may represent an entity (e.g., physically embodied in circuitry) capable of performing operations according to embodiments of the present disclosure while configured accordingly. Alternatively, or additionally, controller circuitry 120 may be embodied as an executor of software instructions, and the instructions may specifically configure the controller circuitry 120 to perform the various algorithms embodied in one or more operations described herein when such instructions are executed. In some embodiments, the controller circuitry 120 includes hardware, software, firmware, and/or a combination thereof that performs one or more operations described herein. Alternatively, or additionally, controller circuitry 120 may be embodied as a fully analog controller (i.e., no firmware instructions but only analog circuitry).

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitries both leverage use of the same processor(s), memory(ies), circuitry(ies), and/or the like to perform their associated functions such that duplicate hardware is not required for each set of circuitry.

Figure 3:
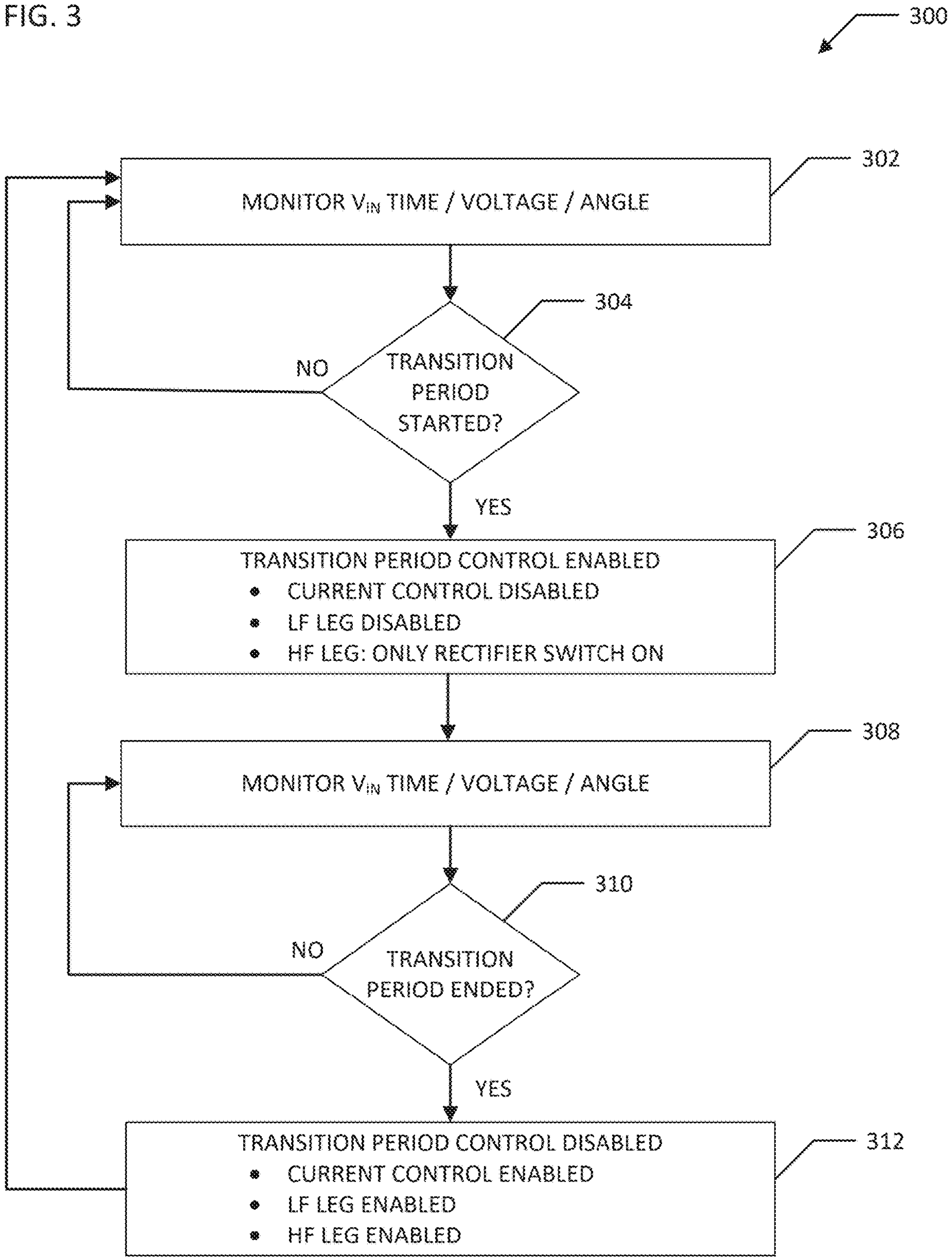
FIG. 3 is an example flow diagram illustrating an example method for providing power factor correction, in accordance with an example embodiment of the present disclosure.

Reference will now be made to FIG. 3, which provides a flowchart illustrating example steps, processes, procedures, and/or operations in accordance with various embodiments of the present disclosure. Various methods described herein, including, for example, example methods as shown in FIG. 3, may provide various technical benefits and improvements. It is noted that each block of the flowchart, and combinations of blocks in the flowchart, may be implemented by various means such as hardware, firmware, circuitry and/or other devices associated with execution of software including one or more computer program instructions. For example, one or more of the procedures described in FIG. 3 may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Having described example systems, apparatuses, computing environments, and user interfaces associated with embodiments of the present disclosure, example flowcharts including various operations performed by the circuits, apparatuses, systems, and/or devices described herein will now be discussed. It should be appreciated that each of the flowcharts depicts an example process that may be performed by one or more of the circuits, apparatuses, systems, and/or devices described herein, for example utilizing one or more of the components thereof. The blocks indicating operations of each process may be arranged in any of a number of ways, as depicted and described herein. In some such embodiments, one or more blocks of any of the processes described herein occur concurrently rather than sequentially. In some such embodiments, one or more blocks of any of the processes described herein occur in-between one or more blocks of another process, before one or more blocks of another process, and/or otherwise operates as a sub-process of a second process. Additionally or alternative, any of the processes may include some or all of the steps described and/or depicted, including one or more optional operational blocks in some embodiments. In regard to the below flowcharts, one or more of the depicted blocks may be optional in some, or all, embodiments of the disclosure. Optional blocks are depicted with broken (or "dashed") lines. Similarly, it should be appreciated that one or more of the operations of each flowchart may be combinable, replaceable, re-ordered, and/or otherwise altered as described herein.

Referring now to FIG. 3, an example flow diagram illustrating an example method 300 for providing power factor correction in accordance with some embodiments of the present disclosure is illustrated. In some embodiments, the example method 300 may be implemented by an example device described herein, including, but not limited to, the example PFC device 100 described above in connection with FIG. 1.

In the example method shown in FIG. 3, the example method 300 starts at step/operation 302. At step/operation 302, a controller (such as, but not limited to, the controller circuitry 120 of the PFC device 100 described above in connection with FIG. 1) monitors the AC input voltage $V_{in}$ (such as the time since the immediately preceding zero crossing, the voltage, or the phase angle, as described above) to be able determine if a transition zone has started.

At step/operation 304, a controller (such as, but not limited to, the controller circuitry 120 of the PFC device 100 described above in connection with FIG. 1) determines if a transition zone has started based on the monitoring of the input voltage $V_{in}$ at step/operation 302.

If it is determined at step/operation 304 that a transition zone has not started, the method 300 returns to step/operation 302 and continues to monitor the AC input voltage $V_{in}$. If it is determined at step/operation 304 that a transition zone has started, the method 300 proceeds to step/operation 306.

At step/operation 306, a controller (such as, but not limited to, the controller circuitry 120 of the PFC device 100 described above in connection with FIG. 1) enables the transition zone control, as described above. For example, in various embodiments the current control is disabled, the low frequency leg is disabled (by opening the low frequency switches), and, for the high frequency leg, the rectifier switch is closed and opened according to a transition duty cycle.

At step/operation 308, a controller (such as, but not limited to, the controller circuitry 120 of the PFC device 100 described above in connection with FIG. 1) monitors the AC input voltage $V_{in}$ (such as the time since the immediately preceding zero crossing, the voltage, or the phase angle, as described above) to be able determine if the transition zone has ended.

At step/operation 310, a controller (such as, but not limited to, the controller circuitry 120 of the PFC device 100 described above in connection with FIG. 1) determines if the transition zone has ended based on the monitoring of the input voltage $V_{in}$ at step/operation 308.

If it is determined at step/operation 310 that the transition zone has not ended, the method 300 returns to step/operation 308 and continues to monitor the AC input voltage $V_{in}$. If it is determined at step/operation 310 that the transition zone has ended, the method 300 proceeds to step/operation 312.

At step/operation 312, a controller (such as, but not limited to, the controller circuitry 120 of the PFC device 100 described above in connection with FIG. 1) disables the transition zone control, as described above. For example, in various embodiments the current control is enabled, the low frequency leg is enabled, and the high frequency leg is enabled.

In some embodiments, the example method shown in FIG. 3 continuously repeats.

While various embodiments of the present disclosure are described herein in relation to single channel totem pole PFC devices, various embodiments of the present disclosure can also be used with interleaved multi-channel totem pole PFC devices. While various embodiments of the present disclosure are described herein in relation to digital totem pole PFC devices, various embodiments of the present disclosure can also be used with analog totem pole PFC devices.

Various embodiments of the present disclosure can be used with totem pole PFC devices using various operation modes (e.g., continuous conduction mode, critical conduction mode, zero voltage switching, etc.), various control methods (e.g., average current control, hysteresis current control, voltage mode control, etc.), or bidirectional power flow like ac-dc (PFC mode) or dc-ac (INVERTER mode). Various embodiments of the present disclosure can provide current spike limitation in PFC devices with low inductance and/or low switching frequency and/or a light load.

CONCLUSION

Many modifications and other embodiments of the disclosures set forth herein will come to mind to one skilled in the art to which these disclosures pertain having the benefit of teachings presented in the foregoing descriptions and the associated drawings. Although the figures only show certain components of the apparatus and systems described herein, it is understood that various other components may be used in conjunction with the system. Therefore, it is to be understood that the disclosures are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above.

Additionally, the section headings used herein are provided for consistency with the suggestions under 37 C.F.R. 1.77 or to otherwise provide organizational cues. These headings shall not limit or characterize the disclosure(s) set out in any claims that may issue from this disclosure.

While this detailed description has set forth some embodiments of the present disclosure, the appended claims cover other embodiments of the present disclosure which differ from the described embodiments according to various modifications and improvements. For example, the appended claims can cover any form of PFC device, such as but not limited to bridgeless PFC boost rectifiers, bridgeless PFC boost rectifiers with bidirectional switch, pseudo totem pole bridgeless PFC boost rectifiers, and boost type PFC rectifiers (or inverters) with active bridge.

Within the appended claims, unless the specific term "means for" or "step for" is used within a given claim, it is not intended that the claim be interpreted under 35 U.S.C. 112, paragraph 6.

What is claimed is:

1. A totem pole power factor correction device comprising:

a low frequency leg comprising first and second low frequency switches;

a high frequency leg comprising first and second high frequency switches;

an alternating current (AC) voltage input comprising a first leg electrically connected between the first and second low frequency switches and a second leg electrically connected between the first and second high frequency switches, the AC voltage input adapted to receive an AC input voltage to be converted to a direct current (DC) output voltage; and a controller connected to and configured to control the first and second low frequency switches and the first and second high frequency switches;

wherein, during each of a plurality of transition zones, each transition zone starting before and ending after a respective zero crossing of the AC input voltage, the controller is configured to (i) hold open the first and second low frequency switches and one of the first and second high frequency switches and (ii) close and open a different one of the first and second high frequency switches according to a predetermined transition duty cycle; and wherein, between transition zones, the controller is configured to control the closing and opening of the first and second low frequency switches and the first and second high frequency switches according to a predetermined operating duty cycle for each of the first and second low frequency switches and the first and second high frequency switches to provide power factor correction.

2. The device of claim 1, wherein, during each transition zone when the AC input voltage is transitioning from a negative voltage to a positive voltage, the controller is configured to hold open the first high frequency switch and to close and open the second high frequency switch according to the predetermined transition duty cycle; and wherein, during each transition zone when the AC input voltage is transitioning from a positive voltage to a negative voltage, the controller is configured to hold open the second high frequency switch and to close and open the first high frequency switch according to the predetermined transition duty cycle.

3. The device of claim 1, wherein, during each transition zone when the AC input voltage is transitioning from a negative voltage to a positive voltage, the midpoint voltage of the low frequency leg gradually transitions from its maximum value to zero; and wherein, during each transition zone when the AC input voltage is transitioning from a positive voltage to a negative voltage, the midpoint voltage of the low frequency leg gradually transitions from zero to its maximum value.

4. The device of claim 1, wherein the predetermined transition duty cycle is less than ten percent.

5. The device of claim 1, wherein the predetermined transition duty cycle is fixed.

6. The device of claim 1, wherein the predetermined transition duty cycle is variable.

7. The device of claim 6, wherein, during each respective transition zone, the predetermined transition duty cycle increases from a first predetermined duty cycle value to a second predetermined duty cycle value greater than the first predetermined duty cycle.

8. The device of claim 1, wherein each of the first and second low frequency switches and the first and second high frequency switches comprise one or more switching transistors.

9. The device of claim 1, wherein each of the first and second low frequency switches comprise one or more thyristors.

10. The device of claim 1, wherein each of the first and second low frequency switches comprise one or more diodes.

11. A method of providing power factor correction, the method comprising:

providing a totem pole power factor correction device, the totem pole power factor correction device comprising:

(a) a low frequency leg comprising first and second low frequency switches;

(b) a high frequency leg comprising first and second high frequency switches;

(c) an alternating current (AC) voltage input comprising a first leg electrically connected between the first and second low frequency switches and a second leg electrically connected between the first and second high frequency switches; and (d) a controller connected to and configured to control the first and second low frequency switches and the first and second high frequency switches;

supplying, to the AC voltage input of the totem pole power factor correction device, an AC input voltage to be converted to a direct current (DC) output voltage;

during each of a plurality of transition zones, each transition zone starting before and ending after a respective zero crossing of the AC input voltage, (i) holding open, by the controller, the first and second low frequency switches and one of the first and second high frequency switches and (ii) closing and opening, by the controller, a different one of the first and second high frequency switches according to a predetermined transition duty cycle; and between transition zones, closing and opening, by the controller, the first and second low frequency switches and the first and second high frequency switches according to a predetermined operating duty cycle for each of the first and second low frequency switches and the first and second high frequency switches to provide power factor correction.

12. The method of claim 11, wherein, during each transition zone when the AC input voltage is transitioning from a negative voltage to a positive voltage, the controller holds open the first high frequency switch and closes and opens the second high frequency switch according to the predetermined transition duty cycle; and wherein, during each transition zone when the AC input voltage is transitioning from a positive voltage to a negative voltage, the controller holds open the second high frequency switch and closes and opens the first high frequency switch according to the predetermined transition duty cycle.

13. The method of claim 11, wherein, during each transition zone when the AC input voltage is transitioning from a negative voltage to a positive voltage, the midpoint voltage of the low frequency leg gradually transitions from its maximum value to zero; and wherein, during each transition zone when the AC input voltage is transitioning from a positive voltage to a negative voltage, the midpoint voltage of the low frequency leg gradually transitions from zero to its maximum value.

14. The method of claim 11, wherein the predetermined transition duty cycle is less than ten percent.

15. The method of claim 11, wherein the predetermined transition duty cycle is fixed.

16. The method of claim 11, wherein the predetermined transition duty cycle is variable.

17. The method of claim 16, wherein, during each respective transition zone, the predetermined transition duty cycle increases from a first predetermined duty cycle value to a second predetermined duty cycle value greater than the first predetermined duty cycle.

18. The method of claim 11, wherein each of the first and second low frequency switches and the first and second high frequency switches comprise one or more switching transistors.

19. The method of claim 11, wherein each of the first and second low frequency switches comprise one or more thyristors.

20. The method of claim 11, wherein each of the first and second low frequency switches comprise one or more diodes.

* * * * *